(12) United States Patent
Köster

(10) Patent No.: US 11,511,578 B2
(45) Date of Patent: Nov. 29, 2022

(54) TRAILER CONTROLLER FOR MOUNTING ON A TRAILER

(71) Applicant: SAF-HOLLAND GmbH, Bessenbach (DE)

(72) Inventor: Mario Sebastian Köster, Bodman-Ludwigshafen (DE)

(73) Assignee: SAF-HOLLAND GmbH, Bessenbach (DE)

( * ) Notice: Subject to any disclaimer, the term of this patent is extended or adjusted under 35 U.S.C. 154(b) by 349 days.

(21) Appl. No.: 16/639,698

(22) PCT Filed: Aug. 24, 2018

(86) PCT No.: PCT/EP2018/072841
§ 371 (c)(1),
(2) Date: Feb. 17, 2020

(87) PCT Pub. No.: WO2019/042874
PCT Pub. Date: Mar. 7, 2019

(65) Prior Publication Data
US 2020/0307329 A1    Oct. 1, 2020

(30) Foreign Application Priority Data
Aug. 31, 2017    (DE) ................. 10 2017 119 969.1

(51) Int. Cl.
*B60D 1/36*        (2006.01)
*B60W 60/00*       (2020.01)
(Continued)

(52) U.S. Cl.
CPC ............. *B60D 1/36* (2013.01); *B60D 1/015* (2013.01); *B60D 1/62* (2013.01); *B60W 60/0025* (2020.02); *B60W 2300/14* (2013.01)

(58) Field of Classification Search
CPC ............ B60D 1/36; B60D 1/015; B60D 1/62; B60W 60/0025; B60W 2300/14
See application file for complete search history.

(56) References Cited

U.S. PATENT DOCUMENTS 11,048,251 B2 *   6/2021   Wood .................... G05D 1/0257
11,052,944 B2 *   7/2021   Kabos ..................... G01S 17/42
(Continued)

FOREIGN PATENT DOCUMENTS

DE    202013008221 U1    4/2014
DE    102014012330 A1    2/2016
(Continued)

OTHER PUBLICATIONS

European Patent Office; International Search Report; dated Nov. 28, 2018.

*Primary Examiner* — Kevin Hurley
*Assistant Examiner* — Marlon A Arce
(74) *Attorney, Agent, or Firm* — Price Heneveld LLP

(57) ABSTRACT

A trailer controller for mounting on a trailer, wherein the trailer controller has at least one position-determining unit which is designed to detect a current position of at least two regions predefined on a trailer, in order to determine a current position and an alignment. In addition, the invention relates to a trailer having a trailer controller and a coupling system, as well as to a method for carrying out a coupling process between a tractor unit and a trailer with a coupling system.

15 Claims, 6 Drawing Sheets

(51) Int. Cl.
*B60D 1/01* (2006.01)
*B60D 1/62* (2006.01)

(56) References Cited

U.S. PATENT DOCUMENTS

| 11,256,264 | B2* | 2/2022 | Hoofard | G05D 1/0225 |
| 2002/0154005 | A1 | 10/2002 | Wall et al. | |
| 2014/0200759 | A1 | 7/2014 | Lu et al. | |
| 2015/0345939 | A1 | 12/2015 | Salter et al. | |
| 2016/0052548 | A1 | 2/2016 | Singh et al. | |
| 2019/0039425 | A1* | 2/2019 | Dodd | G05D 1/0088 |

FOREIGN PATENT DOCUMENTS

| DE | 2016218603 A1 | 3/2018 |
| EP | 1238577 A1 | 9/2002 |
| EP | 3081405 A2 | 10/2016 |
| JP | 2002012172 A1 | 1/2002 |
| WO | 2009006529 A1 | 1/2009 |
| WO | 2016065017 A1 | 4/2016 |
| WO | 2017100716 A1 | 6/2017 |
| WO | 2017123880 A1 | 7/2017 |

* cited by examiner

TRAILER CONTROLLER FOR MOUNTING ON A TRAILER

BACKGROUND OF THE INVENTION

The present invention relates to a trailer controller for mounting on a trailer, to a trailer with a trailer controller as well as to a coupling system with a tractor unit and a trailer. In addition, the present invention relates to a method for carrying out a coupling process between a tractor unit and a trailer.

Parking systems for assisting a parking process of a tractor vehicle with a trailer are already known. However, for the parking process the trailer is already coupled to the tractor vehicle. The parking systems which are already known consequently relate to the parking of a trailer which is already coupled to a tractor unit. It is not known how the coupling of a tractor vehicle or of a tractor unit to a trailer can be assisted.

The present invention is therefore based on the object of making available a device in order to assist a coupling process between a tractor unit and a trailer, in particular also to make it possible to carry out said process automatically. In addition, the present invention is based on the object of making available a trailer which can be coupled automatically, and of making available a coupling system comprising a tractor unit and a trailer with which an automatic coupling process can be carried out. In addition, the present invention is based on the object of making available a method for carrying out such a coupling process.

SUMMARY OF THE INVENTION

A trailer controller for mounting on a trailer is proposed here, wherein the trailer controller has at least one position-determining unit for determining a current position and an alignment. The position-determining unit is designed to detect a current position of at least two regions or sections or positions predefined on a trailer, in order to determine an alignment of the trailer controller in relation to a trailer and/or an alignment of the trailer itself, in particular on which the trailer controller is mounted. The position-determining unit is designed to interrogate a current position of at least two predefined regions by means of radio waves, such as for example by means of global position-determining means such as e.g. in particular GPS or the like. The term "current position of a predefined position or of a predefined region" can mean here that a predefined position or a predefined region on a trailer or on or in a trailer controller per se is permanently predefined but the trailer or the trailer controller can be moved so that the current position or the coordinates thereof change with respect to the surface of the Earth. Therefore, it is significant here to detect a current position of a predefined region i.e. the current, in particular global, coordinates of the predefined region. In order to determine the current position of the trailer controller and a current alignment of the trailer controller, the positions of two predefined regions which are spaced apart from one another and at each of which a transceiver unit can be arranged are acquired and used to evaluate the orientation, i.e. the alignment of the trailer and/or of the trailer controller. The determination of the alignment of the trailer and/or of the trailer controller can be carried out with two position determinations or a plurality of position determinations. If, for example, two position determinations are acquired, the alignment of the trailer controller or of a trailer at which the trailer controller is arranged is acquired on the basis of a straight line through these two regions. If, on the other hand, three position determinations are used to acquire the alignment, a plane can be positioned, i.e. acquired, through the acquired positions. Consequently, with the proposed trailer controller it is possible to acquire the position and the alignment of a trailer reliably, in particular automatically, after the mounting on a trailer advantageously.

Preferably, one region, or the at least two predefined regions which are, in particular, spaced apart from one another, is/are arranged in the region of or in the trailer controller. It is also conceivable that transceiver units are arranged at the predefined regions, which units can each interrogate a current position in a database. The predefined regions are preferably arranged in the trailer controller and/or outside the trailer controller on a trailer. In particular, the at least one transceiver unit is arranged at a predefined region on a trailer. One predefined region, preferably all the predefined regions, can be arranged underneath the loading area of the trailer and/or one of the predefined regions, in particular all the predefined regions, can be arranged on a structure of the trailer which covers the loading area. It is particularly preferred, in order to acquire the alignment particularly reliably, if all the predefined regions are arranged on the roof and/or the roof structure, in particular in a triangular shape. In order to simplify determination of the direction of the trailer, the triangular arrangement of the predefined regions should be embodied here in such a way that they are arranged symmetrically with respect to the longitudinal direction of the trailer, and advantageously in such a way that this triangular arrangement points in the direction of travel in the case of straight-ahead travel of the trailer. Other markers which permit the position-determining unit to determine the current position can also be arranged in the predetermined regions. The markers could be in the form of chips or the like. As a result, the current position and/or the alignment of the trailer can be advantageously determined. Since the trailer has a certain extent, it is advantageous to arrange at least one predefined region at or near to a circumferential region of the trailer, in particular in the region of a roof structure of the trailer. As a result, the current position or the current alignment of the trailer can be reliably determined. In particular, the alignment can be determined particularly reliably the further the at least two predefined regions are spaced apart from one another, and therefore it is preferred if the ratio of the maximum distance of the predefined regions in a longitudinal direction of the trailer with respect to the overall length of the trailer in the longitudinal direction is in a range from 0.6 to 0.95. However, the ratio is particularly preferably in a range from 0.75 to 0.9, this is because as a result particularly reliable determination of the alignment of the trailer is possible. The longitudinal direction is here, in particular, that direction in which the trailer has its largest extent. Alternatively or additionally, the longitudinal direction is preferably here the direction in which the trailer travels in the case of straight-ahead travel. At least one predefined region is particularly preferably arranged on the trailer, in particular near to the kingpin of the trailer, in order to determine the alignment of the trailer controller with respect to the trailer. It is also conceivable to arrange the trailer controller in a predefined region in such a way that the alignment and position of the trailer controller with respect to the trailer are predefined and do not have to be determined.

The position-determining unit is preferably embodied as a GPS unit and/or as a GPRS unit for interrogating the current position by means of GPS and/or GPRS and/or for communicating with local transmission masts, wherein, in particular, comparable methods for determining locations can also be used. The trailer controller can consequently interrogate its current position either by means of an external GPS/GPRS system or by contacting the local transmission masts, wherein it is preferred if the GPS sensors and/or the GPRS systems are, in particular one is, in each case respectively arranged in the predefined regions. In addition, any comfortable method for determining the location can be used, wherein, in particular, methods which are accessible to triangulation are suitable. At any rate, for the interrogation of the current position of the trailer controller, radio signals or signals by means of infrared or radar or the like, are exchanged between the trailer controller and the external position-determining unit. In particular, signals are exchanged which are suitable for carrying out triangulation.

A currently detected position preferably comprises at least three, particular global, spatial coordinates, in particular a height coordinate which indicates a distance from the surface of the Earth. With the current position of the trailer or the trailer controller it is possible to pass on information about a load state of a trailer on which the trailer controller is arranged. This is because the larger the load on a trailer, the smaller the vertical distance from the surface of the Earth will be. This is because the smaller the load on a trailer, the larger the vertical distance from the surface of the Earth will be. Additionally and/or alternatively, the filling level of a possible air suspension system can also be indirectly detected in this way. Therefore, it is advantageous to determine the height coordinate, in order to make possible or to facilitate as well as possible a subsequent coupling process between a trailer and a tractor unit. If the trailer is overloaded, i.e. a tractor unit would, under certain circumstances, destroy the trailer during a coupling process and/or is not sufficiently dimensioned in terms of the engine power to tow the trailer, this may be indicated to a user in the tractor vehicle even before the coupling process. One of the advantages of the determination of a height coordinate is consequently to be seen in the fact that the coupling height, which is also referred to as the hitching height, between the tractor unit and the trailer can be adjusted in order to assist the coupling process.

The trailer controller preferably has an evaluation unit for evaluating the detected position, in particular with respect one another, in order to acquire an alignment of the trailer controller with respect to a trailer by determining a straight line through at least two predefined positions or by determining a plane through at least three predefined positions. In particular, the position-determining unit comprises the evaluation unit or is connected to the evaluation unit. The evaluation unit can comprise hear a memory unit, an energy source and/or a control unit or be connected thereto. In particular, the evaluation unit is designed to implement an algorithm for determining the current position and for determining the current alignment as soon as current spatial coordinates or current positions have been detected.

A further aspect of the present invention relates to a trailer having a trailer controller, in particular as has already been described, for determining a current position and/or an alignment of the trailer in order to assist a process of coupling to a tractor unit. The trailer has at least two predefined regions which are arranged spaced apart from one another. A trailer controller is mounted here, in particular permanently, on the trailer. The trailer controller can comprise here a position-determining unit. The trailer controller can also comprise an evaluation unit and further components. The position-determining unit is designed to detect a current position of the at least two predefined regions in order to determine an alignment of the trailer and/or of the trailer controller in relation to the trailer.

The trailer controller is also designed to interrogate a current position of the at least two predefined regions, in particular in a database, which regions are assigned to the current position and/or to the alignment of the trailer controller on the trailer. The detected current position data can be transferred to an evaluation unit by the position-determining unit, wherein the evaluation unit is designed to determine an alignment of the trailer from the current positions, in order to assist a process of coupling to a tractor unit. It is particularly preferred to arrange the trailer controller on the trailer in a predefined relationship or at a predefined distance with respect to a kingpin of the trailer. As a result, the currently detected positions with respect to the corresponding kingpin of the trailer can be placed with respect to or in relation to one another. as a result, a coupling process between a tractor unit and the trailer can be reliably carried out with respect to the position of the kingpin.

The trailer preferably has at least two, particularly preferably at least three or more, predefined regions at each of which a transceiver unit is arranged which each interrogate the current position, in particular the coordinates, and transfer them in particular to the position-determining unit and/or in particular to the evaluation unit. In particular, each transceiver unit transfers an identification code to the position-determining unit in order to unambiguously check the assignment to the corresponding trailer. The at least two predefined regions are preferably arranged spaced apart from one another on the trailer. Here, for example a predefined region can be provided in or at the trailer controller while a further predefined region is arranged at a further location which is spaced apart as far as possible from the first predefined region on the trailer. The at least two predefined regions particularly preferably lie on opposite sides of the trailer, in particular on opposite sides along a longitudinal axis or longitudinal direction of the trailer. As a result of the fact that each transceiver unit preferably also transfers an identification code to the position-determining unit for the unambiguous checking of the assignment to the corresponding trailer, situations are avoided in which two trailers which are next to one another transfer their position data to an evaluation unit. The determination of the alignment and of the position of the corresponding trailer is therefore unambiguous and reliable.

Preferably, each transceiver unit is attached to a fixed position or a fixed region on the trailer. The fixed positions or regions on the trailer are particularly preferably predefined regions at which the transceiver units are arranged. As a result, it can be checked, for example in the algorithm which is used for evaluating the current alignment or position of the trailer, whether the currently detected coordinates or positions correspond to a possible fixed region of the transceiver unit stored in the evaluation unit. This rules out the possibility of position data being confused for those of other trailers.

The detected current positions are or can preferably be transferred to the evaluation unit for determining the alignment, wherein the evaluation unit is designed to determine from the transferred detected predefined regions an axis/straight line or a plane which span the detected predefined regions. By means of the position of two points, control software can calculate an axis or a plane through three points, the position of which axis or plane is known to a kingpin. As a result, the alignment of the trailer can in turn be acquired reliably and unambiguously.

The evaluation unit preferably determines the height of the trailer above the surface of the Earth, in order to determine, in particular to calculate, whether a tractor unit can be coupled to the trailer. If coupling cannot take place, that is to say if the trailer is, for example, overloaded and correspondingly has an excessively small height above the surface of the Earth, this can be indicated to a user in the utility vehicle. As a result it is possible to avoid a situation in which the trailer or the tractor unit is destroyed or damaged during coupling.

For each predefined region a relative position with respect to the kingpin of the trailer can be or is preferably also stored in the evaluation unit. The term "position" is meant to mean here, in particular, a position and/or an alignment with respect to the kingpin of the trailer. Determining the relative position of the predefined region, in particular of a transceiver unit, relative to the kingpin ensures that a coupling process between a tractor unit and the trailer can take place securely.

A distance from the trailer controller and/or a distance from the edges which are spaced apart parallel to the kingpin can be or is stored in the trailer controller. In particular, storing a distance from the edges of the trailer can ensure that a position and a direction can be passed on to a user of a tractor unit, from which position and direction a user can approach the trailer with the utility vehicle in order to carry out the coupling process between the utility vehicle and the trailer.

The evaluation unit is preferably designed to transfer, in particular by means of a wireless connection, the interrogated or evaluated coordinates of the predefined regions and/or the relative position of the kingpin to a tractor unit which is to be coupled. In particular, the evaluation unit can transfer the interrogated or evaluated positions to a tractor unit via a transmitter unit of the trailer controller. The transfer of the evaluated positions preferably occurs here in an encrypted form in order to prevent unauthorized access to this data. The trailer controller therefore preferably has an encryption unit or an encoder. The transfer this data can preferably occur directly by means of radio waves. The transferred positions can also be preferably displayed to a user of the tractor unit on a screen.

The position-determining unit preferably communicates with a GPS database or with local transmission masts or the like in order to interrogate the current predefined regions and/or positions.

A further aspect of the present invention relates to a coupling system which, as described above, comprises a tractor unit and a trailer. In addition, the coupling system comprises a trailer controller, in particular as has been described above. The tractor unit comprises here at least one control unit which is designed to communicate with the trailer controller in order to interrogate a current position and/or an alignment with respect to the trailer, and wherein the control unit is designed to make corresponding adjustments at the tractor unit, in order to carry out an in particular automatic coupling process between the tractor unit and the trailer. In particular, the control unit is designed to make adjustments to the wheels of the tractor unit in such a way that a coupling process to the trailer can be carried out. In this process, angular adjustments with respect to an axle on which the wheels are suspended are correspondingly determined and made by the control unit. Alternatively or additionally, the control unit can also preferably control the engine power and/or the braking power of the tractor unit. As a result, the tractor unit can couple securely and reliably to the trailer.

The corresponding adjustments preferably comprise wheel adjustments of the tractor unit, in particular angular adjustments with respect to an axis of the tractor unit and/or distance from the kingpin of the trailer which is to be coupled. In view of a detected distance of the tractor unit from the kingpin, the wheels of the tractor unit can have an angle with respect to an axis of the tractor unit in a range of 0°-90°, preferably in a range of 0°-35°.

The tractor unit of the coupling system preferably comprises a screen on which the evaluated predefined regions and/or the relative position of the kingpin, in particular a vertical distance of the kingpin from the surface of the Earth, can be displayed to a user of the tractor unit. In particular, a current distance and a currently spanned angle between a docking point of the tractor unit and the kingpin of the trailer can be displayed to the user. The tractor unit preferably also has a sensor unit which detects the current angle of at least one steerable wheel of an axle of the tractor unit. A current root of the tractor vehicle is preferably calculated on the basis of this angular position detected by the sensor, and is then additionally displayed on the screen so that the user can monitor the coupling process, in particular from a birds eye view, and/or carry it out manually and/or can intervene in a corrective fashion in the automatic coupling process. Alternatively or additionally, a detection system in the form of a detection unit, which can comprise, for example, a camera system and/or a sensor system, in particular a radar system and/or lidar system, can preferably be arranged at a region of the tractor unit which lies opposite a docking position of the trailer. A trailer which is to be coupled can therefore be detected visually and displayed to a user. In addition, the evaluated position data can be displayed on the screen. In particular, the evaluated position data can be displayed superimposed on the detected visual image. In addition, a distance of the tractor unit from the trailer and wheel settings of the trailer can be displayed to a user on the screen.

The tractor unit is preferably of self-propelling design, and can automatically actuate the evaluated predefined regions and/or the relative position of the kingpin to carry out the process of coupling to the trailer. In particular, the tractor unit has a detection system for detecting the surroundings on a coupling side of the tractor unit. The detection system can be embodied, for example, as a camera system which displays images visually to the user on the screen of the tractor unit.

According to a further aspect of the present invention, a method for carrying out a coupling process between a tractor unit and a trailer with a coupling system, as has already been described, is proposed. In this context, the coupling system has a tractor unit and a trailer. A trailer controller, in particular as already described, for interrogating and evaluating a current position and alignment of the trailer is arranged on the trailer. The trailer controller has an evaluation unit for evaluating and transferring the current position and alignment to a control unit of the tractor unit. The proposed method comprises the following steps: determining an alignment of the trailer by evaluating a straight line or a plane through at least two or at least three detected current positions of predefined regions on the trailer, transmitting the current position and the alignment of the trailer to a control unit of the tractor unit, in particular by means of a wireless connection, and actuation of the current position and the alignment of the trailer by means of the tractor unit in order to carry out an in particular automatic coupling process. Consequently, in order to carry out the proposed method, a trailer control device as described and a trailer as described are used in a system as described. In order to carry out the proposed method, the tractor unit and the control device which is attached to the trailer communicate about the current position and the current alignment of the trailer and of the tractor unit with respect to one another. It is conceivable to monitor the proposed method by means of a camera system which is preferably arranged on the tractor unit.

Before a coupling process is executed, a trailer with a described trailer controller can firstly be identified and/or its location determined automatically in a vehicle fleet.

BRIEF DESCRIPTION OF THE DRAWINGS

Further advantages and features of the present invention are evident from the following description of preferred embodiments with reference to the appended figures. It goes without saying that individual embodiments which are shown in the respective figures can have features which can also be used in other embodiments even if this is not explicitly mentioned, provided that this is not excluded owing to technical circumstances or explicitly ruled out. In the figures.

DETAILED DESCRIPTION OF THE PREFERRED EMBODIMENTS

Figure 1:
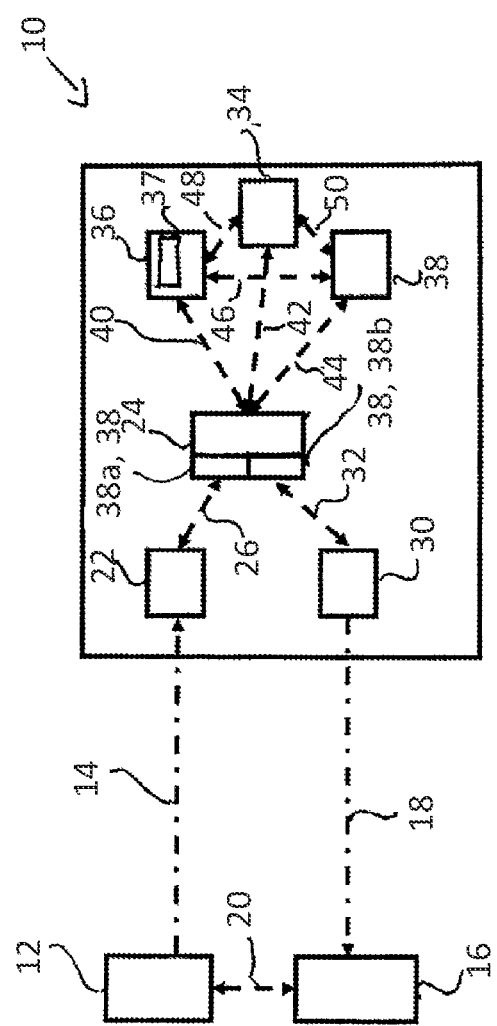
FIG. 1 shows a schematic view of a trailer controller which can interact with a transmitter unit and/or a receiver unit.

FIG. 1 shows a trailer controller 10 which can communicate with a transmitter unit 12. The communication between the transmitter unit 12 and the trailer controller 10 is indicated by the arrow 14. In addition, the trailer controller 10 can communicate with a receiver unit 16. This communication is indicated by the arrow 18. In addition, it is conceivable that the transmitter unit 12 and the receiving unit 16 can communicate with one another, which is indicated by the double arrow 20. It is conceivable that the transmitter unit 12 and the receiver unit 16 are combined in one unit (not illustrated).

In order to receive a signal from the external transmitter unit 12, the trailer controller 10 has a receiver unit 22 which transfers the received signal to a comparator 24. Between the receiver unit 22 and the comparator 24 there can be a wire connection or a wireless connection. The communication between the comparator 24 and the receiver unit 22 is illustrated in FIG. 1 by the double arrow 26. The comparator 24 is designed to compare the received signal with a predefined signal. The predefined signal can be stored here in the comparator 24 itself or in a memory unit 28. The comparator 24 and the memory unit 28 can communicate with one another (double arrow 44).

If the received signal corresponds to the predefined signal, the comparator 24 transfers a response signal to a transmitter unit 30, which is indicated by the double arrow 32. In addition to the predefined signal, the current position and/or the response signal or other data can be newly stored or already stored in the memory unit 28.

In particular, the memory unit 28 is communicatively connected to further units 34, 36, 38. The communication between the units 24, 28, 34, 36, 38 is indicated schematically by the double arrows 40, 42, 44, 46, 48, 50.

As illustrated in FIG. 1, the memory unit 28 is coupled, for example, to a position-determining unit 36. The position-determining unit 36 is embodied, in particular, as a GPS unit and serves to determine a current position of the trailer controller 10. The position-determining unit 36 is connected to the comparator 24 and/or an encryption unit 38, 38*b* or a decryption unit 38, 38*a* for communication. In particular, the decryption unit 38, 38*a* and the encryption unit 38, 38*b* are embodied as one unit. It is also conceivable that the decryption unit 38*a* and the encryption unit 38*b* are embodied as two different units. The encryption unit 38, 38*b* or the decryption unit 38, 38*a* are optional.

As illustrated in FIG. 1, the trailer controller 10 can have an energy source 34 which supplies the further units of the trailer controller with energy. The energy source 34 can be embodied, for example, with an accumulator which can charge itself if a trailer on which the trailer controller 10 is mounted is coupled to a tractor unit.

Figure 2:
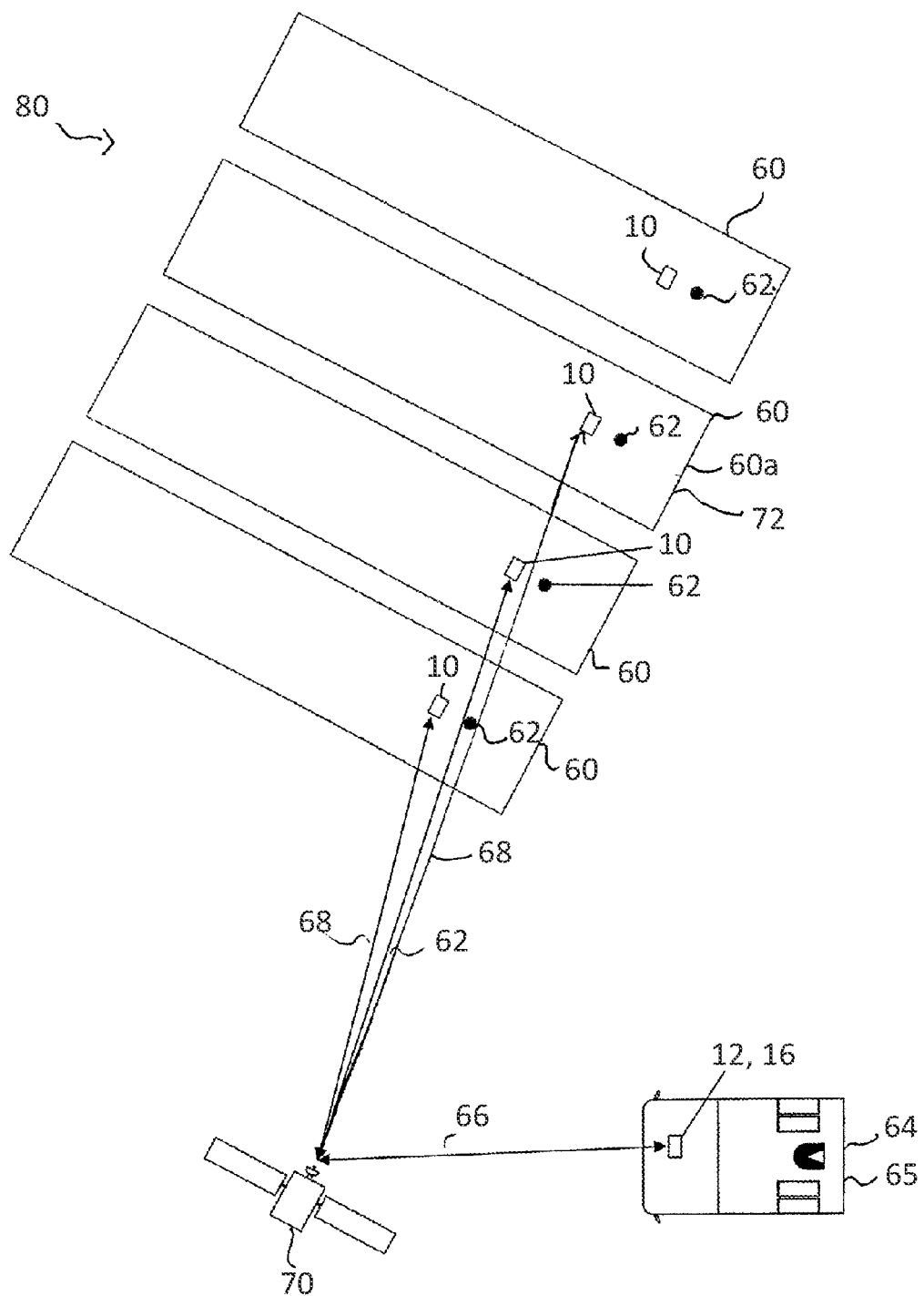
FIG. 2 shows a system for determining the location of and/or identifying a trailer with a trailer control unit.
Figure 3:
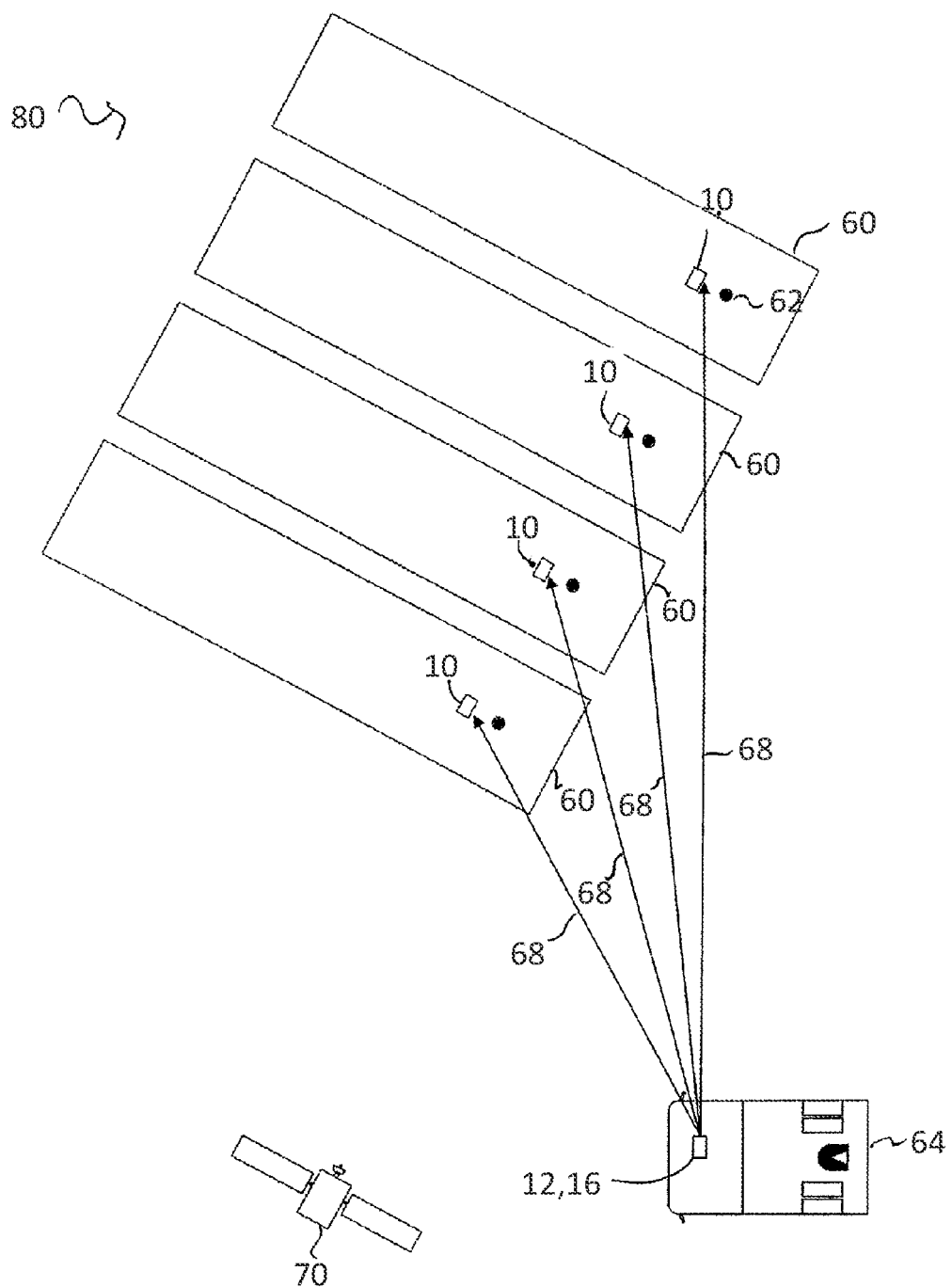
FIG. 3 shows an alternative embodiment of the system according to FIG. 2.
Figure 4:
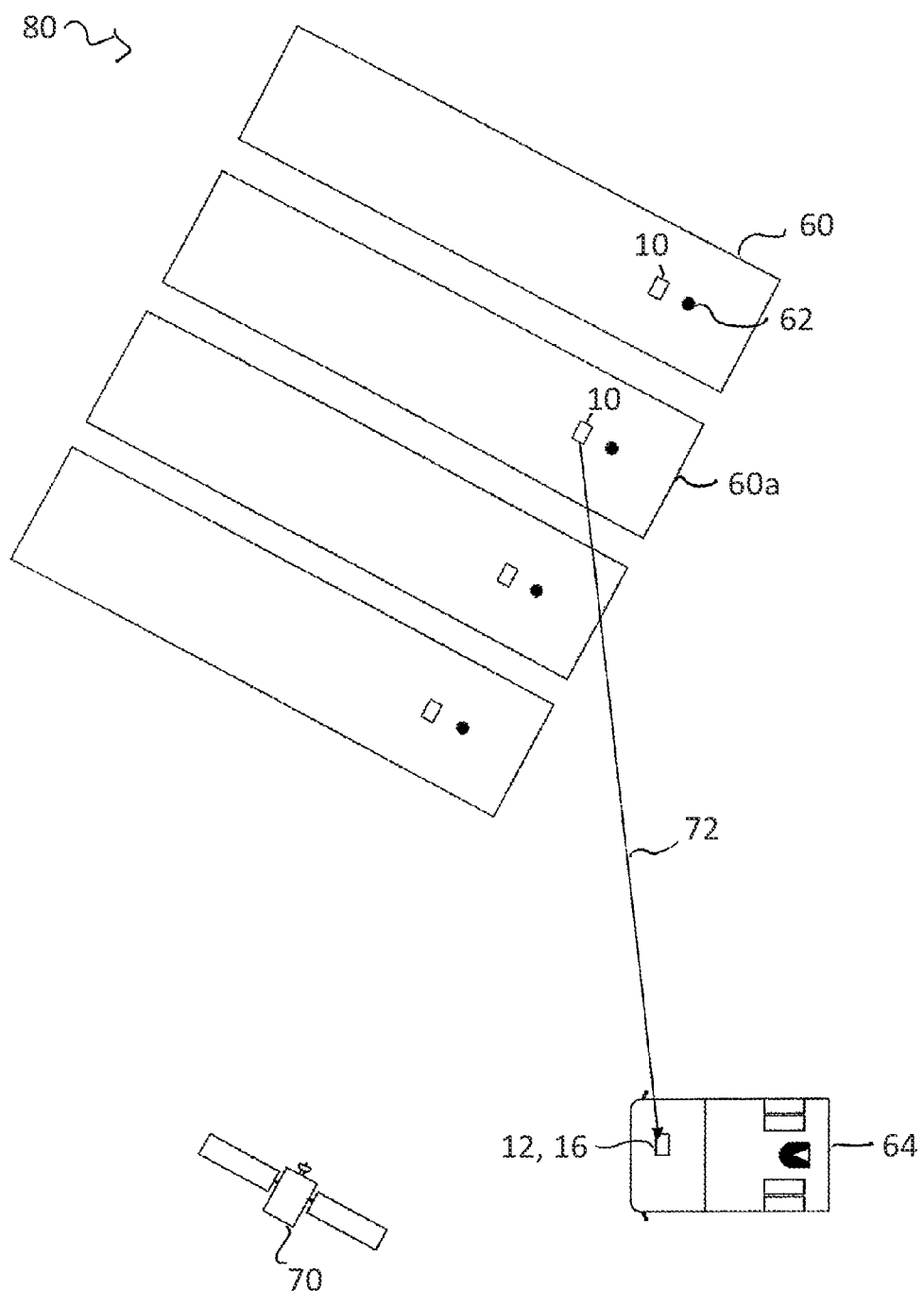
FIG. 4 shows a system according to FIGS. 3 and 2, which system transmits a response signal to an external receiver unit.

The embodiments of the system 84 determining the location of a trailer 60 are explained below with respect to FIGS. 2, 3 and 4 in combination. FIGS. 2, 3 and 4 consequently each show a system 80. In particular, FIG. 2 shows how a tractor unit 64, which comprises the external transmitter unit 12 and/or the external receiver unit 16, transmits a signal to an external GPS unit 70. The external GPS unit 70 passes on the signal to the trailer controllers 10, which are each mounted on a trailer 60. The signal forwarding lines are each indicated by the arrows 66 and 68 in FIG. 2. Each of the trailers 60 has, in addition to the trailer controller 10, a kingpin 62, to which the tractor unit 64 can be coupled. As illustrated in FIG. 2, the tractor unit 64 or the external transmitter unit 12 of the tractor 64, firstly transfers a signal to a plurality of trailers 60, in order to acquire the current position of a trailer 60*a* whose location is to be determined.

FIG. 2 shows an embodiment of the system in which the tractor unit 64 or the positionally fixed logistics unit transfers the signal, to be received by the trailers 60, to the trailer 60 via an external GPS unit 70. According to the embodiment which is illustrated in FIG. 3, the tractor unit 64 or the positionally fixed logistics unit transmits the signal directly to the trailer controllers 10 of the trailers 60. This can also be done, for example, via local transmission masts (not illustrated). The received signal is, as already described above with respect to FIG. 1, evaluated, i.e. compared with a predefined signal, by each trailer 60 or by each trailer controller 10 which is mounted on a trailer 60. When a predefined signal corresponds to the received signal, a trailer 60, i.e. the trailer 60*a* whose location is to be determined, transmits back a response signal to the receiver unit 16 in the tractor unit 64. In the proposed system 80, in order to determine the location of a trailer 60*a* of a plurality of trailers 60, an interrogation signal is firstly transmitted to a plurality of trailers 60. The corresponding trailer 60*a* whose location is to be determined transmits back a response signal to the tractor unit 64 or to the positionally fixed logistics unit only when the received signal corresponds to a predefined signal, which is preferably stored in the trailer controller 10.

The trailer 60a whose location is to be determined can be identified or its location determined by transmitting back the response signal, which is indicated by the reference number 72 in FIG. 4. The location of the trailer 60a is determined, in particular, automatically. Such determination of location is illustrated schematically in FIG. 4, wherein such determination of location occurs in a system according to FIG. 2 and also according to FIG. 3.

Figures 5A, 5B:
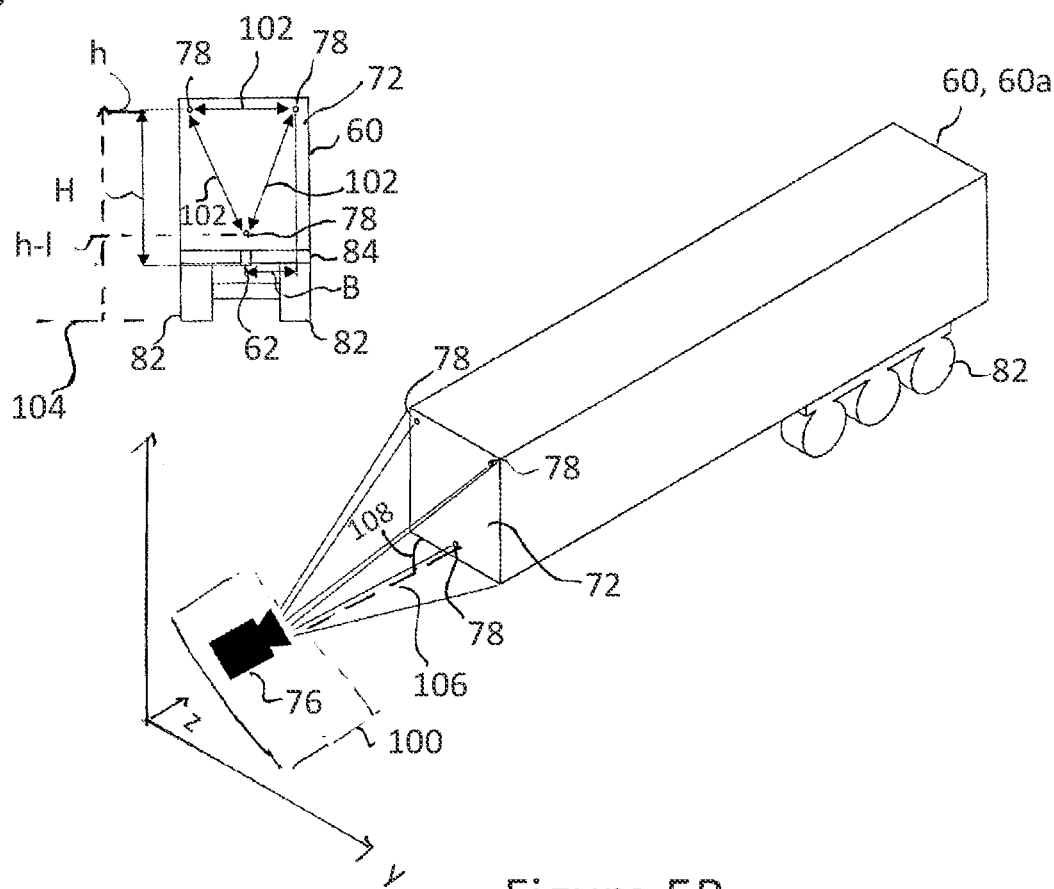
FIGS. 5A and 5B show a trailer, in particular a semitrailer, on which a trailer controller according to the invention is mounted.

FIGS. 5A and 5B show a trailer 60 or a trailer 60a whose location is to be determined and to which a tractor unit 64 is to be coupled after the location of the trailer 60a has been determined. In order to assist the coupling process between the tractor unit 64 and the trailer 60a, the response signal can, in particular, comprise location coordinates which assist automatic coupling between the trailer 60a and the tractor unit 64. A camera system 76, which is preferably arranged on the tractor unit 64 (not illustrated) is illustrated only schematically in FIGS. 5A and 5B. Such a camera system 76 can assist the coupling process between the tractor unit 64 and the trailer 60, 60a further, in particular for the purpose of visual display to a driver of the tractor unit 64. In order to assist the coupling process between the trailer 60a and the tractor unit 64, permanently predefined points 78, which can be detected by the camera system 76, are arranged on the trailer 60, 60a. The permanently predefined points 78 permit the location of the kingpin 62 to be determined, in particular by assisting a driver. This is because a height H and/or a width W of the predefined points 78 with respect to the kingpin 62 of the trailer are permanently predefined and independent of a load of the trailer 62. The determination of the location of the predefined points 78 can consequently be used by a driver to approach the trailer 62 correctly, and can be detected and used by the camera system 76 to indicate possibly required brief corrections of the tractor unit. In particular, a height h can change as a result of loading of the trailer 60, 60a or as a result of a current tire pressure of the tires 82. It is therefore significant that the height H is independent of the load state. In particular a fixed point 78 indicates a distance between the kingpin 62 and an outer edge 84 of trailer 60, 60a.

Figure 6:
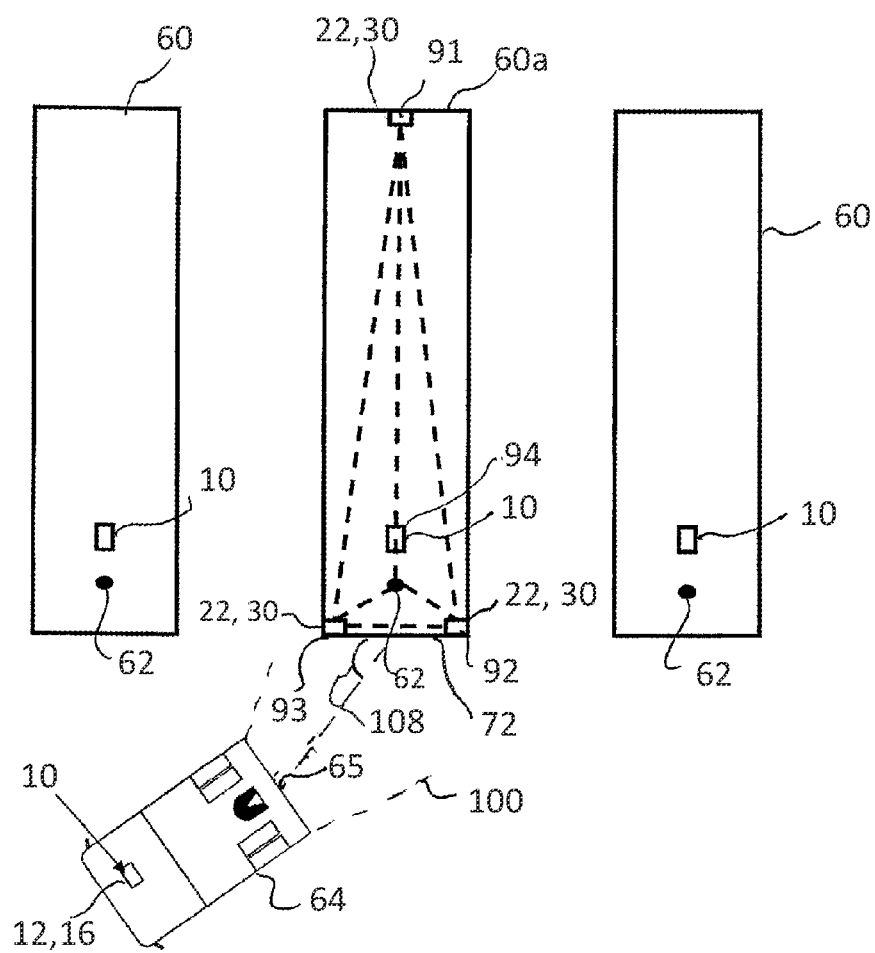
FIG. 6 shows a schematic plan view of a coupling system according to the invention, which can be used after determination of the position and alignment of a trailer to be coupled in a vehicle fleet for a coupling process.

FIG. 6 shows a multiplicity of trailers 60 each with a trailer controller 10 and a kingpin 62. The trailer 60a whose location has been determined also has a coupling system according to the invention with predefined regions 91, 92, 93 of the trailer 60, 60a whose location has been determined. The predefined regions 91, 92, 93 of the trailer 60, 60a can each be detected by means of a transceiver unit. The detected positions of the predefined regions 91, 92, 93 can then be evaluated by means of an evaluation unit 37 which is integrated into the trailer controller 10. For example straight lines or planes through the detected points 91, 92, 93 are acquired in the evaluation unit 37. It is also conceivable that the trailer controller 10 also constitutes a detected position 94. The detected positions 91-94 can then be determined, for example, in relation to the kingpins 62 of the trailer 60a whose location has been determined. The transceiver unit of the trailer 60, 60a interrogates the current position, i.e. the coordinates of the corresponding predefined point 91-94, by way of an external GPS system 70 or by way of local transmission masts, for example. By means of the detected points 91-94, the position and alignment of the trailer 60, 60a is determined, in particular in relation to the kingpin, using software, and stored, if appropriate, in the memory unit 28. The necessary position data are preferably transmitted by means of a data connection from the trailer control unit 10 to a tractor unit 64, so that the tractor unit 64 can actuate the trailer 60a whose location has been determined, and coupling can be carried out between the tractor unit 64 and the trailer 60a.

After the location of the trailer 60a has been determined, the tractor unit 64 actuates the trailer 60a whose location has been found, in order to couple said trailer. In order to carry out the coupling process, the detection unit 100, which comprises, in particular, a camera system 76 and/or a sensor system and is arranged on a coupling side 65 of the tractor unit 64, detects the detectable pattern 77 on a coupling side 72 of the trailer 60, 60a, wherein the detectable pattern 77 is given by the predefined points 78. The detection unit 100 can detect the detectable pattern 77, for example by means of ultrasonic sound and/or optically or the like. As illustrated in FIG. 5, the predefined points 78 are arranged in a triangular configuration on the coupling side 72, wherein two predefined points are each arranged at an upper outer region above the surface 104 of the Earth at a height h, and a permanently predefined point 78 above the kingpin 62 is at a height h-1 above the surface 104 of the Earth, and the height h-1 is less than the height h. It is conceivable that the detectable pattern 77 is arranged in another configuration of the permanently predefined points on the coupling side 72, in particular with a different number of permanently predefined points. The detection unit 100 is connected to a control unit, in particular by a wired connection or by a wireless connection, in order to evaluate the detectable pattern 77. When an evaluation occurs, in particular by means of triangulation, a current distance 106 and/or a current angle 108 are/is determined between the trailer 60, 60a and the tractor unit 64 and/or a height h of the trailer 60, 60a. The evaluation is preferably carried out on the subset of pixels which have detected the detectable pattern 77. If the current angle 108 and/or the current distance 106 is not provided for an optimum coupling process, for example wheel settings of the tractor unit 64 can be changed so that a coupling process can be carried out as well as possible. The permanently predefined points 78 are arranged on the coupling side 72 of the trailer 60, 60a at a permanently predefined distance 102. A permanently predefined distance on 102 between two permanently predefined points 78 can be different from a permanently predefined distance 102 between two other permanently predefined points 78, as is apparent, for example, from the triangular configuration according to FIGS. 5A and 5B.

The detection unit 100, in particular the camera system 74, detects an image with a permanently predefined total number of pixels, wherein the detectable pattern 77 and/or the trailer edges are/is detected in a subset of the total number of pixels, and by evaluating the subset of pixels at which the detectable pattern 77 and/or the trailer edges is/are detected it is possible to acquire a current distance 106 and/or an angle 108 between the detection unit 100 and the trailer 60, 60a. In particular, a height h of the trailer 60, 60a from the surface 104 of the Earth can be acquired by the detection unit 100. The detected height h consequently indicates a distance from the surface 104 of the Earth, as a result of which a load state of the trailer 60, 60a can be estimated. In particular, the determination of the height h makes it possible to detect overloading of the trailer 60, 60a, in the case of which a coupling process would bring about damage to the tractor unit 64 and/or the trailer 60, 60a. The lower the number of the pixels which detect the detectable pattern 77, the greater the current distance 106 between the trailer 60, 60a and the tractor unit 64. In contrast, the higher the number of pixels which detect the detectable pattern 77, the shorter the current distance 106 between the trailer 60, 60a and the tractor unit 64. In addition, an asymmetrical distribution of the subset of pixels which have detected the detectable pattern 77 indicates that the trailer 60, 60a and the tractor unit 64 are at an angle 108 with respect to one another. The term asymmetrical distribution means here that, for example, in a region on the coupling side 72 a number n>0 of pixels has detected a permanently predefined point 78, while a different symmetrically arranged, permanently predefined points 78 is detected only by a number m>0 of pixels, wherein m<n, and m and n are natural integers. If an angle of approximately 90° were provided between an extent of the detection unit 100 and the coupling side 72, it would be the case that m=n. This is equivalent to an extent of the detection unit 100 parallel to the extent of the trailer 60, 60a in the z direction (see FIGS. 5A and 5B).

List of Designations

10. Trailer controller
12. Transmitter unit
14. Signal transmission
16. Receiver unit
18. Signal transmission
20. Receiver unit
24. Comparator
26. Signal transmission
28. Memory unit
30. Transmitter unit
32. Signal transmission
34. Energy source
36. Position-determining unit
37. Evaluation unit
38. Encryption unit/decryption unit
38a Decryption unit
38b Encryption unit
40-50: Signal transmission
60. Trailer
62. Kingpin
64. Tractor unit
65. Coupling side of tractor unit
66. Signal transmission
68. Signal transmission
70. External GPS unit
72. Coupling side of trailer
76. Camera system
77. Detectable pattern
78. Fixed point
80. System
82. Tire
84. Edge
91-94: Predefined position or predefined region
100. Detection unit
102. Predefined distance
104 Surface of the Earth
106 Current distance
108 Angle
H: Height
W: Width
h: Height with respect to the surface of the earth
h-l: Height with respect to the surface of the earth, wherein h-l<h

The invention claimed is:

1. A trailer controller configured to mount on a trailer, the trailer controller comprising:
at least one position-determining unit configured to detect a current position of at least two regions predefined on a trailer to determine a current position and an alignment, wherein the at least two regions predefined on the trailer are arranged on the roof and/or the roof structure in a triangular shape, and wherein the detected current position of the at least two regions comprises at least three spatial coordinates, including a height coordinate which indicates a distance from the surface of the Earth.

2. The trailer controller as claimed in claim 1, wherein one of the at least two predefined regions is arranged proximate to or in the trailer controller.

3. The trailer controller as claimed in claim 1, wherein the position-determining unit includes a GPS unit or a GPRS unit configured to interrogate a current position by GPS or GPRS or for communicating with local transmission masts.

4. The trailer controller as claimed in claim 1, further comprising:
an evaluation unit configured to evaluate the detected current positions of the at least two regions.

5. A trailer having a trailer controller as claimed in claim 1, for determining a current position and/or an alignment of the trailer in order to assist a coupling process to a tractor unit, wherein the trailer includes the at least two regions which are arranged spaced apart from one another, the trailer controller comprises a position-determining unit, and wherein the position-determining unit is configured to detect a current position of the at least two regions in order to determine an alignment of the trailer and/or of the trailer controller in relation to the trailer.

6. The trailer as claimed in claim 5, wherein the trailer controller is configured to interrogate current positions of the at least two regions in a database, where the at least two regions are assigned to the current position and/or to the alignment of the trailer controller on the trailer, wherein the trailer controller is configured to transfer the current positions of the at least two regions to an evaluation unit, and wherein the evaluation unit is configured to determine an alignment of the trailer from the current positions of the at least two regions to assist a process of coupling to a tractor unit.

7. The trailer as claimed in claim 5, wherein the trailer comprises, at each of the at least two regions, a transceiver unit which respectively interrogates coordinates of the current position, and transfers the coordinates to the position-determining unit, and wherein each transceiver unit transfers an identification code to the position-determining unit in order to check the assignment to the corresponding trailer.

8. The trailer as claimed in claim 7, wherein each transceiver unit is attached to a fixed position or a fixed region on the trailer.

9. The trailer as claimed in claim 5 wherein the evaluation unit determines the height of the trailer above the surface of the Earth, in order to determine whether a tractor unit can be coupled to the trailer.

10. A trailer controller configured to mount on a trailer, the trailer controller comprising:
at least one position-determining unit configured to detect a current position of at least two regions predefined on a trailer to determine a current position and an alignment, wherein the at least two regions predefined on the trailer are arranged on the roof and/or the roof structure in a triangular shape;
for determining a current position and/or an alignment of the trailer in order to assist a coupling process to a tractor unit, wherein the tractor includes the at least two regions which are arranged spaced apart from one another, the trailer controller comprises a position-determining unit, and wherein the position-determining unit is configured to detect a current position of the at least two regions in order to determine an alignment of the trailer and/or of the trailer controller in relation to the trailer; and wherein for each of the at least two regions a relative position with respect to a kingpin of the trailer can be stored in the evaluation unit.

11. A coupling system, comprising:
a tractor unit including at least one control unit;
a trailer; and
a trailer controller including at least one position-determining unit configured to detect a current position of at least two regions predefined on the trailer, wherein the at least two regions are spaced apart from one another and are arranged on the roof and/or the roof structure in a triangular shape, wherein the trailer controller further includes a position-determining unit configured to detect the current position of the at least two predefined regions in order to determine an alignment of the trailer and/or of the trailer controller in relation to the trailer;
wherein the at least one control unit is configured to communicate with the trailer controller in order to interrogate a current position and/or an alignment of the tractor unit with respect to the trailer;
wherein the control unit is configured to make corresponding adjustments at the tractor unit to carry out an automatic coupling process between the tractor unit and the trailer; and
wherein the corresponding adjustments include wheel adjustments of the tractor unit.

12. The coupling system of claim 11, wherein the corresponding adjustment includes angular adjustments of the trailer with respect to an axis of the tractor unit and/or distance of the tractor unit from the kingpin of the trailer.

13. The coupling system as claimed in claim 11, wherein the tractor unit is self-propelling, and automatically actuates the at least two regions and/or the relative position of the kingpin to carry out the process of coupling to the trailer, wherein the tractor unit has a detection system for detecting the surroundings on a coupling side of the tractor unit.

14. A method for coupling a tractor unit and a trailer via a coupling system, comprising:
providing a tractor unit including at least one control unit;
providing a trailer;
providing a trailer controller including at least one position-determining unit configured to detect a current position of at least two regions predefined on the trailer, wherein the at least two regions are spaced apart from one another and are arranged on the roof and/or the roof structure in a triangular shape, wherein the trailer controller further includes a position-determining unit configured to detect the current position of the at least two predefined regions in order to determine an alignment of the trailer and/or of the trailer controller in relation to the trailer;
wherein the at least one control unit is configured to communicate with the trailer controller in order to interrogate a current position and/or an alignment of the tractor unit with respect to the trailer;
wherein the control unit is configured to make corresponding adjustments at the tractor unit to carry out an automatic coupling process between the tractor unit and the trailer;
determining an alignment of the trailer by evaluating an axis or a plane through the at least two regions on the trailer;
wirelessly transmitting the at least two current positions and the alignment of the trailer to the control unit of the tractor unit; and
determining the current position and the alignment of the trailer by the tractor unit in order to carry out an automatic coupling process.

15. The method of claim 14, wherein the at least two regions includes at least three regions, and wherein determining the alignment of the trailer includes evaluating the axis or the plan through the at least three regions.

* * * * *

UNITED STATES PATENT AND TRADEMARK OFFICE
CERTIFICATE OF CORRECTION

| | |
|---|---|
| PATENT NO. | : 11,511,578 B2 |
| APPLICATION NO. | : 16/639698 |
| DATED | : November 29, 2022 |
| INVENTOR(S) | : Köster |

It is certified that error appears in the above-identified patent and that said Letters Patent is hereby corrected as shown below:

In the Specification

Column 3, Line 43:
After "respect" insert -- to --

Column 3, Line 50:
"hear" should be – here –

Column 4, Line 17:
"as" should be – As –

Column 5, Line 39:
After "transfer" insert -- of --

Column 6, Line 22:
"birds" should be – bird's –

Column 10, Line 41:
Delete "on"

In the Claims

Column 12, Claim 9, Line 50:
After "5" insert -- , --

Column 12, Claim 10, Line 64 (2nd occurrence):
"tractor" should be – trailer –

Signed and Sealed this
Fourteenth Day of March, 2023

*Katherine Kelly Vidal*

Katherine Kelly Vidal
*Director of the United States Patent and Trademark Office*